US012687395B2

(12) United States Patent
Kourogi

(10) Patent No.: US 12,687,395 B2
(45) Date of Patent: Jul. 21, 2026

(54) INFORMATION PROCESSING DEVICE, INFORMATION PROCESSING METHOD, AND NON-TRANSITORY COMPUTER READABLE MEDIUM

(71) Applicant: NATIONAL INSTITUTE OF ADVANCED INDUSTRIAL SCIENCE AND TECHNOLOGY, Tokyo (JP)

(72) Inventor: Masakatsu Kourogi, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 406 days.

(21) Appl. No.: 18/265,575

(22) PCT Filed: Dec. 8, 2021

(86) PCT No.: PCT/JP2021/045041
§ 371 (c)(1),
(2) Date: Jun. 6, 2023

(87) PCT Pub. No.: WO2022/124323
PCT Pub. Date: Jun. 16, 2022

(65) Prior Publication Data
US 2024/0035824 A1 Feb. 1, 2024

(30) Foreign Application Priority Data

Dec. 10, 2020 (JP) ................................. 2020-205408

(51) Int. Cl.
*G08G 1/01* (2006.01)
*B60W 40/06* (2012.01)
(Continued)

(52) U.S. Cl.
CPC .............. *G01C 21/12* (2013.01); *G01P 15/18* (2013.01)

(58) Field of Classification Search
CPC .......................... G01C 21/12; G01C 21/3822; G01C 21/3844; G01P 15/18; B60W 2520/10;
(Continued)

(56) References Cited

U.S. PATENT DOCUMENTS 11,467,028 B2 * 10/2022 Sanji ....................... G01W 1/00
11,530,932 B2 * 12/2022 Jean ................... G01C 21/3694
(Continued)

FOREIGN PATENT DOCUMENTS

CN 109238272 A * 1/2019 ............. G01C 21/12
JP 2006131137 A * 5/2006
(Continued)

OTHER PUBLICATIONS

Notice of Allowance for corresponding Japanese Application No. 2022-568301 dated May 7, 2024 and its Machine Translation.
(Continued)

*Primary Examiner* — Eyob Hagos
(74) *Attorney, Agent, or Firm* — Renner, Otto, Boisselle & Sklar, LLP

(57) ABSTRACT

A road vibration coefficient which defines a relation between vibration and a movement velocity of a vehicle during traveling is obtained. An information processing device includes: an acquisition section that acquires a measurement value which has been measured by a sensor provided in a vehicle while the vehicle is traveling on a road surface; a vibration feature quantity calculation section that calculates a vibration feature quantity Pv(t); and
a road vibration coefficient calculation section that calculates a road vibration coefficient ρ.

9 Claims, 11 Drawing Sheets

(51) Int. Cl.

| | |
|---|---|
| *G01C 21/12* | (2006.01) |
| *G01H 17/00* | (2006.01) |
| *G01P 15/18* | (2013.01) |

(58) Field of Classification Search
CPC ..... B60W 2520/105; B60W 2520/125; B60W 2530/18; B60W 40/06; G01H 17/00; G05D 1/12; G08G 1/0112; G08G 1/0133; G08G 1/0141
See application file for complete search history.

(56) References Cited

U.S. PATENT DOCUMENTS

| | | | |
|---|---|---|---|
| 11,830,357 B1 * | 11/2023 | Murphy | ............... G08G 1/0145 |
| 2009/0105921 A1 * | 4/2009 | Hanatsuka | ......... B60G 17/0165 |
| | | | 701/80 |
| 2011/0029184 A1 * | 2/2011 | Brighenti | .............. B60W 50/14 |
| | | | 701/31.4 |
| 2015/0211863 A1 | 7/2015 | Kourogi et al. | |
| 2017/0098127 A1 * | 4/2017 | Kobayashi | ............. G01G 23/01 |
| 2019/0150847 A1 * | 5/2019 | Nakayama | ........... B60W 40/08 |
| 2020/0348167 A1 * | 11/2020 | Takasuka | .............. B60W 40/06 |
| 2021/0024069 A1 * | 1/2021 | Herman | ................. G08G 1/168 |

FOREIGN PATENT DOCUMENTS

| | | | | |
|---|---|---|---|---|
| JP | 2011-245285 A | | 12/2011 | |
| WO | 2006/135090 A1 | | 12/2006 | |
| WO | WO-2013011992 A1 * | | 1/2013 | ........... B60W 40/06 |
| WO | 2014010727 A1 | | 1/2014 | |
| WO | WO-2014115259 A1 * | | 7/2014 | ........... G01M 17/04 |
| WO | WO-2015141199 A1 * | | 9/2015 | ......... B60W 40/068 |

OTHER PUBLICATIONS

Masakatsu Kourogi et al, "A method of vibration-based/vehicle dead-reckoning (VDR) and its evaluation Toward universal indoor localization of moving objects", 2008, with English Abstract.

Masakatsu Kourogi et al., "Indoor positioning system using a self-contained sensor module for pedestrian navigation and its evaluation", Jul. 2008, pp. 151-156, with English Abstract.

Heirich, Oliver etc. Measurement and Analysis of Train Motion and Railway Track Characteristics with Inertial Sensors. 2011 14th International IEEE Conference on Intelligent Transportation Systems. Oct. 5-7, 2011.

Written Opinion for PCT/JP2021/045041 mailed Feb. 15, 2022 and its English Translation.

International Search Report for PCT/JP2021/045041 mailed Feb. 15, 2022 and its English Translation.

* cited by examiner

HAND FORKLIFT. SPEED CHARACTERISTIC STRAIGHT LINE

|  | MEASUREMENT ERROR [m] (%) | VELOCITY ERROR [m/s] |
|---|---|---|
| INITIAL ORIENTATION IS KNOWN | MAXIMUM OF 2.5 m (1.8%) | MAXIMUM OF 0.4 m/s |
| INITIAL ORIENTATION IS UNKNOWN | MAXIMUM OF 3.2 m (2.3%) | |

INFORMATION PROCESSING DEVICE, INFORMATION PROCESSING METHOD, AND NON-TRANSITORY COMPUTER READABLE MEDIUM

TECHNICAL FIELD

The present invention relates to an information processing device and the like for measuring a position of a vehicle-type moving body.

BACKGROUND ART

As an indoor position measurement technique of a vehicle-type moving body (hereinafter, referred to as "vehicle"), an attempt to estimate a movement velocity based on vibration analysis has already been reported (Non-Patent Literature 1). The inventors of the present invention have also pursued research and development of a dead reckoning method (vibration-based dead reckoning (VDR)) that focuses on vibration generated during traveling (Non-Patent Literature 2).

CITATION LIST

Non-Patent Literature

[Non-Patent Literature 1]
O. Heirich, A. Lehner, P. Robertson and T. Strang, "Measurement and Analysis of Train Motion and Railway Track Characteristics with Inertial Sensors", In Proc. of 14th International IEEE Conference on Intelligent Transportation Systems, Oct. 5-7, 2011.
[Non-Patent Literature 2]
Kourogi, Ichikari, Kurata: "Syarin-Gata Idoutai Muke Jiritsu Kouhou (VDR) Ni Motozuku Sokui Syuhou To Sono Hyouka (*Positioning technology based on autonomous navigation (VDR) for wheel-type moving body and evaluation thereof*)", HCG symposium 2018, C-2-5, 2018

SUMMARY OF INVENTION

Technical Problem

Vehicles whose positions are to be measured are not only extremely diverse in kind or type, but also assumed to travel on a various types of road surfaces. Therefore, in order to realize position measurement based on VDR, it is desirable to calibrate, for each road surface, a relation between vibration and a movement velocity of a vehicle during traveling. Specifically, it is desirable, for a vehicle, that a parameter (hereinafter, referred to as "road vibration coefficient $\rho$") which defines a relation between vibration and a movement velocity is obtained for each road surface property.

An object of an aspect of the present invention is to provide an information processing device that makes it possible to obtain a road vibration coefficient which defines a relation between vibration and a movement velocity of a vehicle during traveling.

Solution to Problem

In order to attain the object, an information processing device in accordance with an aspect of the present invention includes: an acquisition section that acquires a measurement value which has been measured by a sensor provided in a vehicle while the vehicle is traveling on a road surface; a vibration feature quantity calculation section that calculates a vibration feature quantity Pv(t) based on expressions below from acceleration values for respective x, y, and z components, the acceleration values being included in the measurement value which has been acquired, $$P_V(t) = \frac{1}{N_{FFT}} \sum_{i=n_m}^{n} \frac{p(f_i)^2}{f_i^2}$$

where $N_{FFT}$ is the number of taps of FFT, $$p(f_i)^2 = px(f_i)^2 + py(f_i)^2 + pz(f_i)^2$$

where $px(f_i)$, $py(f_i)$, and $pz(f_i)$ are power values in a frequency band $f_i$ which have been obtained by FFT from the acceleration values for the respective x, y, and z components, and $f_0$ to $f_{n\_m}$ are a DC component and a near frequency band thereof; and a road vibration coefficient calculation section that calculates a road vibration coefficient $\rho$ based on the vibration feature quantity Pv(t) which has been calculated and an expression below, $$Pv(t) = \rho \cdot v(t)^2$$

where v(t) is a velocity of the vehicle, and $\rho$ is a road vibration coefficient which is a parameter indicating a relationship between the road surface and the vehicle.

In order to attain the object, an information processing device in accordance with an aspect of the present invention includes: an acquisition section that acquires a measurement value which has been measured by a sensor provided in a vehicle while the vehicle is traveling on a road surface; a vibration feature quantity calculation section that calculates a vibration feature quantity Pv(t) based on expressions below from acceleration values for respective x, y, and z components, the acceleration values being included in the measurement value which has been acquired, $$P_V(t) = \frac{1}{N_{FFT}} \sum_{i=n_m}^{n} \frac{p(f_i)^2}{f_i^2}$$

where $N_{FFT}$ is the number of taps of FFT, $$p(f_i)^2 = px(f_i)^2 + py(f_i)^2 + pz(f_i)^2$$

where $px(f_i)$, $py(f_i)$, and $pz(f_i)$ are power values in a frequency band $f_i$ which have been obtained by FFT from the acceleration values for the respective x, y, and z components, and $f_0$ to $f_{n\_m}$ are a DC component and a near frequency band thereof; and a movement velocity calculation step of calculating v(t) based on the vibration feature quantity Pv(t) which has been calculated, an expression below, and a road vibration coefficient $\rho$ which has been set in advance, $$Pv(t) = \rho \cdot v(t)^2$$

where v(t) is a velocity of the vehicle, and $\rho$ is a road vibration coefficient which is a parameter indicating a relationship between the road surface and the vehicle.

In order to attain the object, an information processing method in accordance with an aspect of the present invention includes: an acquisition step of acquiring a measurement value which has been measured by a sensor provided in a vehicle while the vehicle is traveling on a road surface; a vibration feature quantity calculation step of calculating a vibration feature quantity Pv(t) based on expressions below from acceleration values for respective x, y, and z components, the acceleration values being included in the measurement value which has been acquired, $$ P_V(t) = \frac{1}{N_{FFT}} \sum_{i=n_m}^{n} \frac{p(f_i)^2}{f_i^2} $$

where $N_{FFT}$ is the number of taps of FFT, $$ p(f_i)^2 = px(f_i)^2 + py(f_i)^2 + pz(f_i)^2 $$

where $px(f_i)$, $py(f_i)$, and $pz(f_i)$ are power values in a frequency band $f_i$ which have been obtained by FFT from the acceleration values for the respective x, y, and z components, and
$f_0$ to $f_{n\_m}$ are a DC component and a near frequency band thereof; and
a road vibration coefficient calculation section that calculates a road vibration coefficient $\rho$ based on the vibration feature quantity Pv(t) which has been calculated and an expression below, $$ Pv(t) = \rho \cdot v(t)^2 $$

where v(t) is a velocity of the vehicle, and
$\rho$ is a road vibration coefficient which is a parameter indicating a relationship between the road surface and the vehicle.

In order to attain the object, an information processing method in accordance with an aspect of the present invention includes: an acquisition step of acquiring a measurement value which has been measured by a sensor provided in a vehicle while the vehicle is traveling on a road surface; a vibration feature quantity calculation step of calculating a vibration feature quantity Pv(t) based on expressions below from acceleration values for respective x, y, and z components, the acceleration values being included in the measurement value which has been acquired, $$ P_V(t) = \frac{1}{N_{FFT}} \sum_{i=n_m}^{n} \frac{p(f_i)^2}{f_i^2} $$

where $N_{FFT}$ is the number of taps of FFT, $$ p(f_i)^2 = px(f_i)^2 + py(f_i)^2 + pz(f_i)^2 $$

where $px(f_i)$, $py(f_i)$, and $pz(f_i)$ are power values in a frequency band $f_i$ which have been obtained by FFT from the acceleration values for the respective x, y, and z components, and
$f_0$ to $f_{n\_m}$ are a DC component and a near frequency band thereof; and
a movement velocity calculation step of calculating v(t) based on the vibration feature quantity Pv(t) which has been calculated, an expression below, and a road vibration coefficient $\rho$ which has been set in advance, $$ Pv(t) = \rho \cdot v(t)^2 $$

where v(t) is a velocity of the vehicle, and
$\rho$ is a road vibration coefficient which is a parameter indicating a relationship between the road surface and the vehicle.

The information processing device in accordance with each of the aspects of the present invention can be realized by a computer. In such a case, the present invention encompasses (i) a control program of the information processing device which control program causes the computer to serve as the sections (software elements) included in the information processing device for realizing the information processing device and (ii) a computer-readable storage medium storing the control program.

Advantageous Effects of Invention

According to an aspect of the present invention, it is possible to obtain a road vibration coefficient which defines a relation between vibration and a movement velocity of a vehicle during traveling.

DESCRIPTION OF EMBODIMENTS

Embodiment 1

Figure 2:
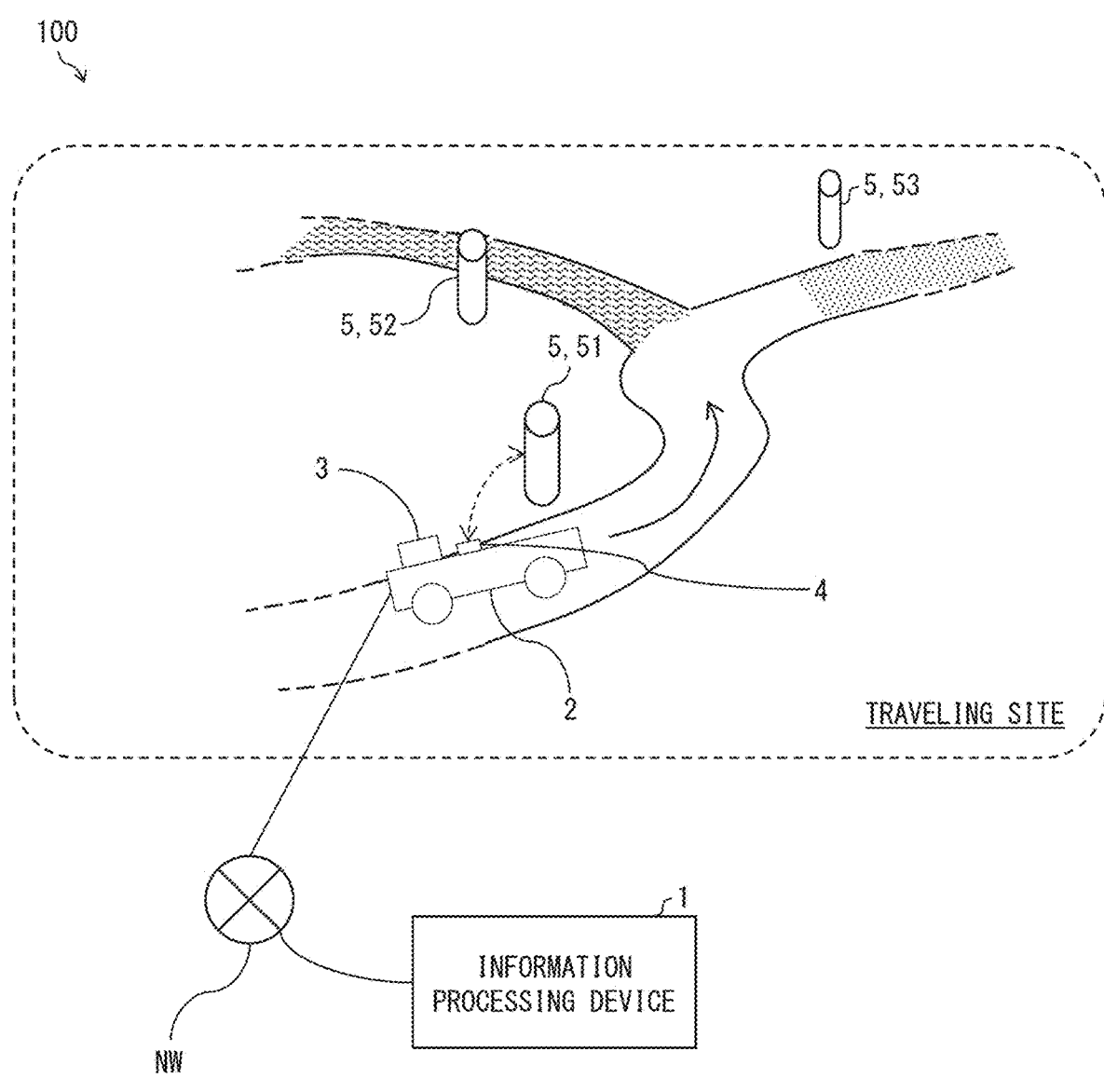
FIG. 2 is a diagram illustrating a schematic configuration of a vehicle position measurement system.

The following description will discuss details of an embodiment of the present invention.
<Overview of Vehicle Position Measurement System>
FIG. 2 is a diagram illustrating a schematic configuration of a vehicle position measurement system. As illustrated in FIG. 2, a vehicle position measurement system 100 includes an information processing device 1, a vehicle 2, and a sensor 3 which is mounted on the vehicle 2. The sensor 3 is, for example, an inertial measurement unit (IMU). Hereinafter the sensor 3 is referred to as "IMU 3".
The vehicle 2 is a vehicle type moving body and travels on a track that is set in a traveling site. Note that the traveling site can be either an outdoor site or an indoor site. In the present embodiment, the vehicle 2 is assumed to be, example, an automobile, a forklift, a cart, an automatic guided vehicle (AGV), or the like.

Figure 3:
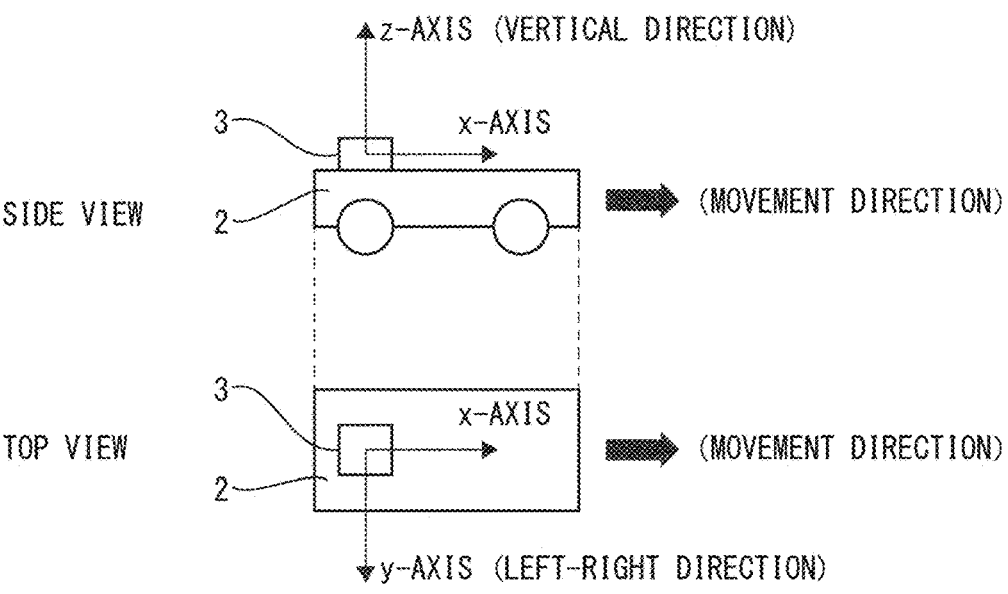
FIG. 3 is a diagram illustrating a definition of a coordinate system of a sensor.

FIG. 3 is a diagram illustrating a definition of a coordinate system of the IMU 3. In the present embodiment, it is assumed that the IMU 3 is attached to the vehicle 2 in a mounting orientation such that the coordinate system of the IMU 3 conforms to the coordinate system of the vehicle 2. In the present embodiment, a movement direction of the vehicle 2 is defined as an x-direction (x-axis), a left-right direction of the vehicle 2 is defined as a y-direction (y-axis), and a vertical direction with respect to an x-y plane is defined as a z-direction (z-axis). That is, in the present embodiment, the vehicle 2 is a moving body that moves forward or backward only in a specific movement direction (x-direction).

The IMU 3 includes a three-directional accelerometer and a triaxial gyroscope, and measures accelerations in three directions of x, y, and z, and angular velocities in three axes of x, y, and z. The IMU 3 measures accelerations in the three directions and angular velocities of the three axes for each unit time Δt. Then, the IMU 3 outputs a measurement value including six element values together with a time stamp indicating a date and time at which the measurement value was measured. Here, the six element values are an x-direction acceleration, a y-direction acceleration, a z-direction acceleration, an x-axis angular velocity, a y-axis angular velocity, and a z-axis angular velocity.

The vehicle position measurement system 100 may further include a receiver 4 which is mounted on the vehicle 2, and a transmitter 5 which transmits a radio wave to be received by the receiver 4. The transmitter 5 is, for example, a Bluetooth (registered trademark) low energy (BLE) beacon corresponding to a BLE format. Hereinafter the transmitter 5 is referred to as "beacon 5". A plurality of beacons 5 are disposed in a traveling site where a road surface on which the vehicle 2 travels exists. Hereinafter, when it is necessary to individually identify individual beacons 5, the beacons are referred to as "first beacon 51", "second beacon 52", "third beacon 53", and so forth. When the vehicle 2 approaches a beacon 5 within a certain distance, the receiver 4 receives a radio signal which is constantly transmitted from the beacon 5.

The receiver 4 receives a radio wave from the beacon 5 when the vehicle 2 has entered a radio wave detection zone of the beacon 5. The receiver 4 outputs a reception record at each reception. The reception record includes (i) a beacon ID which is used for identifying a beacon 5 that is a transmission source and which is included in the radio wave, (ii) reception date and time information indicating a date and time at which the radio wave was received, and (iii) a received signal strength (RSSI) indicating signal strength at the reception.

The vehicle 2 may include a communication device (not illustrated). After the vehicle 2 has finished traveling, the communication device of the vehicle 2 may transmit (i) a measurement value group which has been measured by the IMU 3 while traveling and (ii) a reception record group which has been recorded by the receiver 4 while traveling to the information processing device 1 via the communication network NW. In another example, the vehicle 2 may be provided with a removable storage medium. In this case, after the vehicle 2 has finished traveling, the storage medium which stores a measurement value group measured by the IMU 3 and a reception record group recorded by the receiver 4 is taken out from the vehicle 2 and is connected to the information processing device 1 in a readable manner. In still another example, the communication device (not illustrated) of the vehicle 2 may sequentially transmit measurement values which are measured by the IMU 3 to the information processing device 1 in real time while the vehicle 2 is traveling. Alternatively, the communication device may transmit a reception record to the information processing device 1 each time the receiver 4 receives a radio wave from the beacon 5.

The information processing device 1 analyzes a measurement value group output from the IMU 3, estimates a road surface property of a road surface on which the vehicle 2 has traveled and a velocity of the vehicle 2, and measures a position of the vehicle 2. Specifically, the information processing device 1 obtains a movement locus which has been estimated, by analyzing the measurement value group, from a set of relative positions of the vehicle 2 at respective unit times. After that, the information processing device 1 determines, with use of the reception record group output from the receiver 4, an absolute position in the coordinate system of the traveling site for the estimated movement locus and road surface property. Thus, it is possible to obtain a traveling path of the vehicle 2 in the traveling site and the road surface property in the traveling site.

<Configuration of Information Processing Device>

Figure 1:
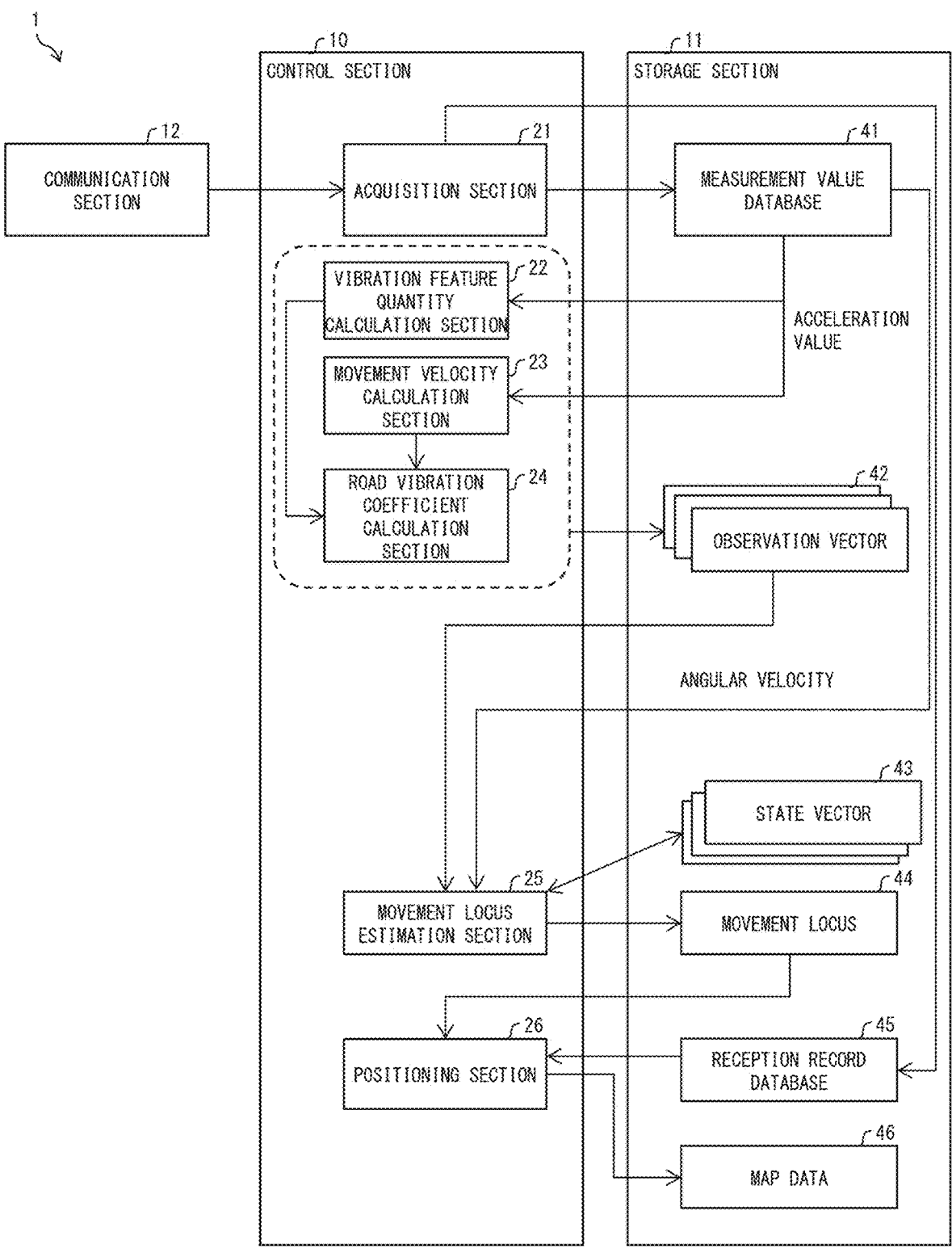
FIG. 1 is a block diagram illustrating a main configuration of an information processing device.

FIG. 1 is a block diagram illustrating a main configuration of the information processing device 1. The information processing device 1 includes a control section a storage section 11, and a communication section 12. The control section 10 collectively controls the sections of the information processing device 1. The storage section 11 stores various kinds of data which are used by the information processing device 1. The communication section 12 communicates, via a communication network NW, with a communication device (not illustrated) of the vehicle 2 or other devices (such as the IMU 3 and the receiver 4) which are mounted on the vehicle 2.

The control section 10 may be constituted by a control device such as, for example, a central processing unit (CPU) or a dedicated processor. Each section of the control section (which will be described later with reference to FIG. 1) can be realized by a control device such as a CPU loading a program stored in a storage device (storage section 11) realized by a read only memory (ROM) or the like into a random access memory (RAM) or the like and executing the program.

The control section 10 includes an acquisition section 21, a vibration feature quantity calculation section 22, a movement velocity calculation section 23, and a road vibration coefficient calculation section 24. The control section 10 may further include a movement locus estimation section 25 and a positioning section 26.

The storage section 11 stores a measurement value database 41 (hereinafter, referred to as "measurement value DB 41") and an observation vector 42. The storage section 11 may further store a state vector 43, a movement locus 44, a reception record database 45 (hereinafter, referred to as "reception record DB 45"), and map data 46.

<Overview of Process>

The acquisition section 21 acquires a measurement value measured by the IMU 3 along with a time stamp from the vehicle 2 via the communication section 12, and causes the measurement value DB 41 to store the measurement value with the time stamp. In the measurement value DB 41, a measurement value group including six element values is registered, on a time-series basis, for each measurement date and time indicated by the time stamp.

The vibration feature quantity calculation section 22 calculates a vibration feature quantity $Pv(t)$.

The movement velocity calculation section 23 calculates a movement velocity v(t) at a time point t.

The road vibration coefficient calculation section 24 calculates a road vibration coefficient ρ which represents vibration strength of the vehicle 2 caused due to a relationship between a vehicle and a road surface on which the vehicle 2 has traveled.

The movement locus estimation section 25 estimates a velocity for each Δt using a Kalman filter. Then, the movement locus estimation section 25 prepares a locus for each Δt using the estimated velocity, and connects the loci to prepare a movement locus.

The positioning section 26 (i) specifies, with use of a beacon signal, an initial condition (initial orientation and initial position of vehicle 2) with which a cost is minimized, (ii) obtains a definitive movement path, and (iii) prepares map data of the traveling site where the vehicle 2 has traveled.

Note that the movement velocity calculation section 23 is capable of calculating v(t) based on the vibration feature quantity Pv(t) which has been calculated, an expression below, and a road vibration coefficient ρ which has been set in advance.

$$Pv(t)=\rho \cdot v(t)^2$$

where v(t) is a velocity of the vehicle, and

ρ is a road vibration coefficient which is a parameter indicating a relationship between the road surface and the vehicle.

In the descriptions below, a "movement locus" which is estimated by the movement locus estimation section 25 is constituted by a set of relative positions of the vehicle 2 at respective unit times. For the "movement locus", an initial position and an initial orientation have not been determined in a coordinate system of a traveling site. The above movement locus is distinguished from a locus of the vehicle 2 referred to as "definitive movement path" for which the initial position and the initial orientation in the coordinate system of the traveling site have been determined and which is ready for being shown on a map of the traveling site.

<Details of Process>

(Calculation of Movement Velocity and Road Vibration Coefficient Based on Vibration Feature Quantity)

The vibration feature quantity calculation section 22 calculates, for each time interval Δt at which a measurement value is measured, a vibration feature quantity Pv(t) based on acceleration values for respective x, y, and z components which are included in the acquired measurement value.

The vibration feature quantity calculation section 22 calculates a vibration feature quantity Pv(t) based on the following expression.

$$P_V(t) = \frac{1}{N_{FFT}} \sum_{i=n_m}^{n} \frac{p(f_i)^2}{f_i^2} \qquad \text{Expression (1)}$$

Where $N_{FFT}$ is the number of taps of FFT, and $p(f_i)$ is a sum of powers of acceleration components which are obtained by FFT in a frequency band $f_i$. The vibration feature quantity calculation section 22 obtains $p(f_i)$ from the following expression (2).

$$p(f_i)^2=PX(f_i)^2+py(f_i)^2+pz(f_i)^2 \qquad \text{Expression (2)}$$

Where $px(f_i)$, $py(f_i)$, and $pz(f_i)$ are power values in a frequency band $f_i$ which have been obtained by FFT from the respective components of acceleration in the x-, y-, and z-directions decomposed into the coordinate system of the IMU 3.

Further, as is clear from expression (1), the vibration feature quantity Pv(t) is strongly affected by a low frequency component. Therefore, it is necessary to exclude a DC component and a near frequency band thereof ($f_0$ to $f_{n\_m}$).

The vibration feature quantity calculation section 22 can directly use a measurement value of the IMU 3 for calculation of $p(f_i)$. Note, however, that, in order to increase the accuracy of the calculation, it is more preferable to calculate $p(f_i)$ by decomposing the measurement value into components in the vertical direction (z-direction) and in the horizontal direction (x-direction and y-direction). The decomposition into the component in the vertical direction and the components in the horizontal direction can be realized, for example, in combination with an attitude measurement method or the like. The decomposition into the component in the vertical direction and the components in the horizontal direction makes it possible to obtain a rotation matrix that is necessary for decomposing a measurement value (acceleration value and angular velocity value) of the IMU 3 into a vertical component and horizontal components.

Figure 4:
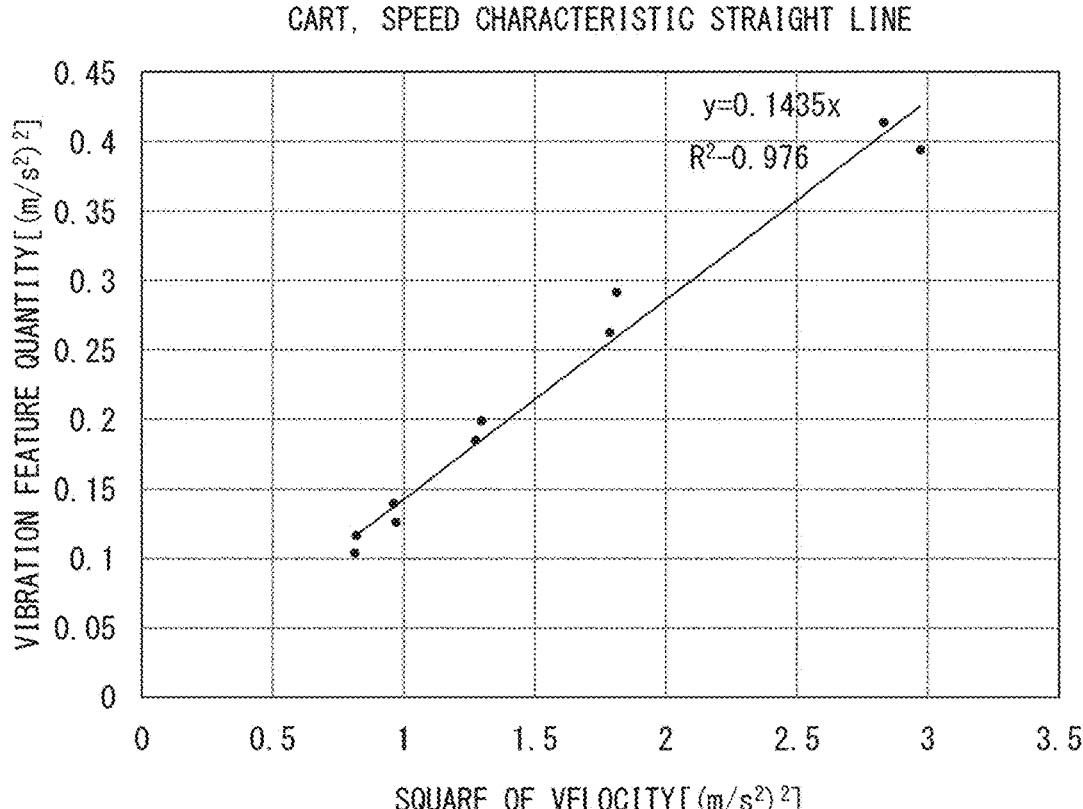
FIG. 4 is a graph indicating a speed characteristic of a certain vehicle.
Figure 5:
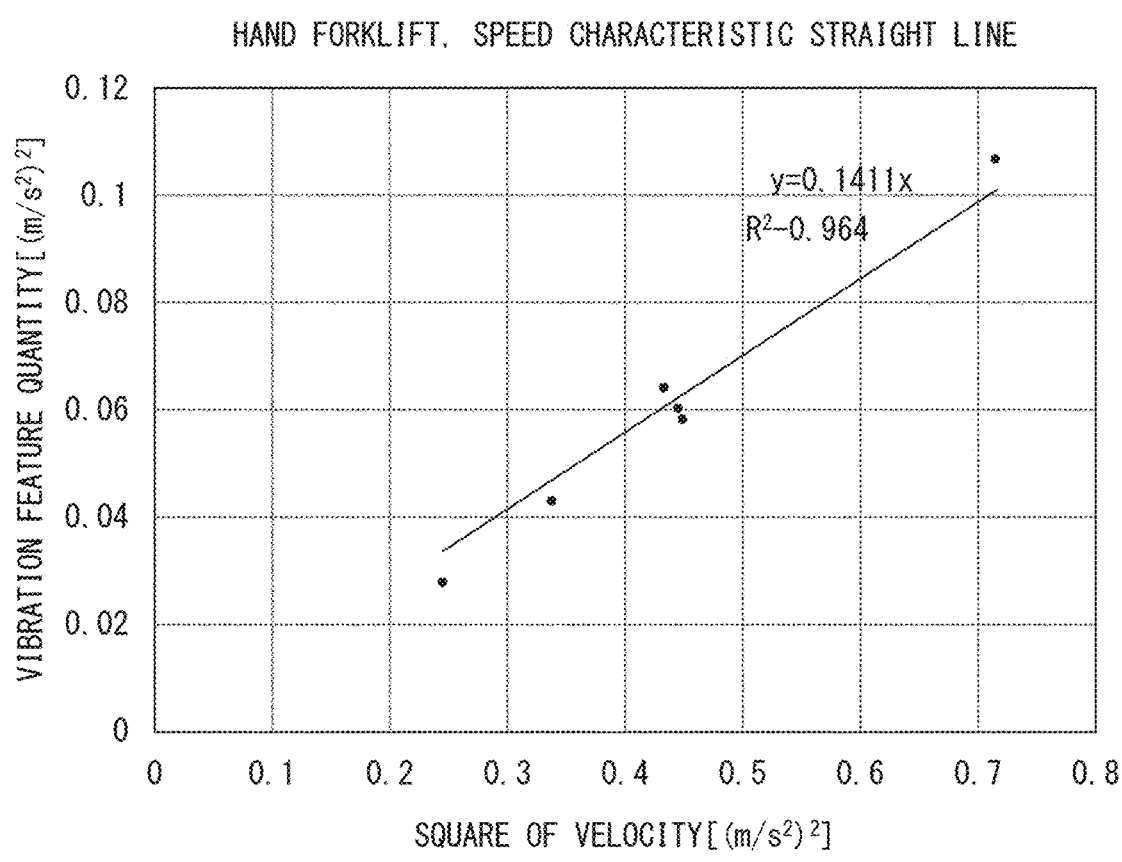
FIG. 5 is a graph indicating a speed characteristic of another vehicle.
Figure 6:
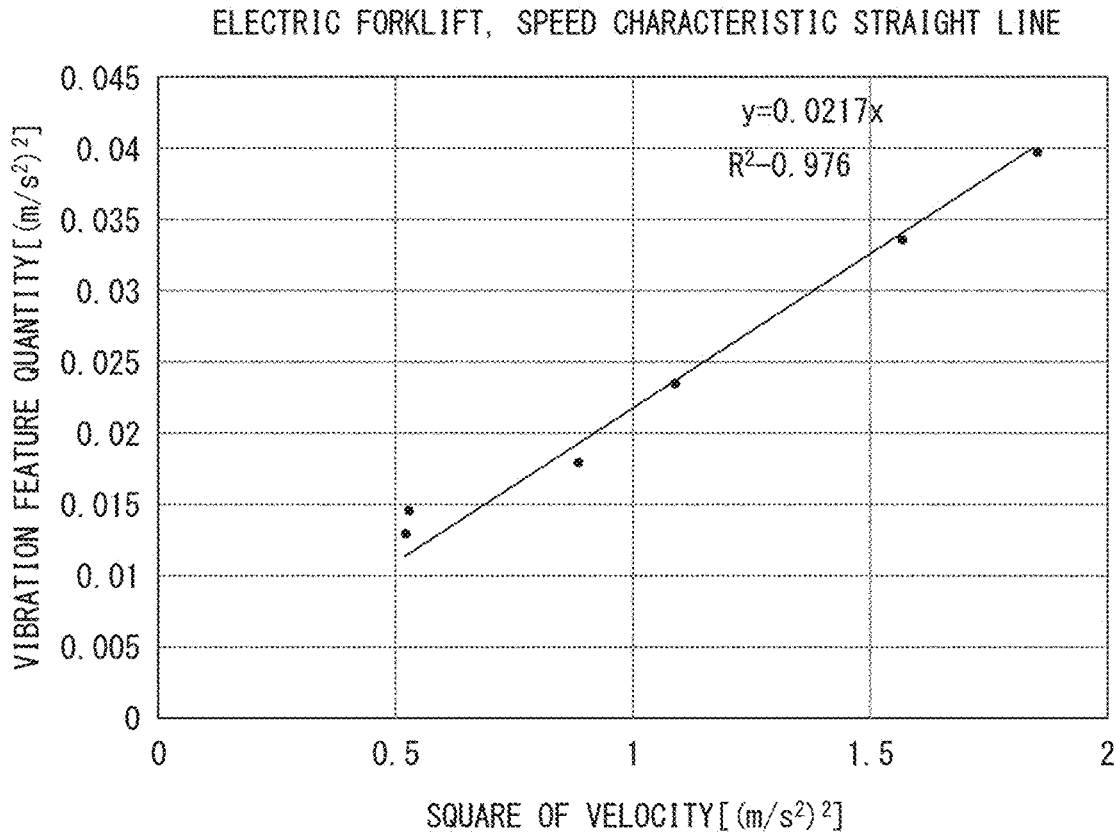
FIG. 6 is a graph indicating a speed characteristic of still another vehicle.

Here, the inventors of the present invention have experimentally confirmed that the vibration feature quantity Pv(t) is highly linearly correlated with a square of a movement velocity v(t) of the vehicle 2 (FIGS. 4 through 6).

$$P_v(t)\propto v(t)^2$$

FIGS. 4 through 6 are graphs indicating speed characteristics of several types of vehicles. FIG. 4 is a graph indicating a speed characteristic of a cart. FIG. 5 is a graph indicating a speed characteristic of a hand forklift (TRUSCO NAKAYAMA CORPORATION, model number: THP-20-511). FIG. 6 is a graph indicating a speed characteristic of an electric forklift (Sumitomo Nacco Forklift Co., Ltd., QuaPro-R, model number: 61FBR135). Note that a condition for calculating a vibration feature quantity is as follows: $N_{FFT}$=128, $F_s$=100 [Hz], and components in a frequency band from DC to 6 Hz ($f_0$ to $f_{n\_m}$: DC component and a near frequency band thereof) are cut off.

In each of the graphs, a high linear correlation is shown between the vibration feature quantity and the square of the movement velocity. As is clear from the graphs of FIGS. 4 through 6, even in vehicles which are completely different in motion mechanism or motive power from each other, the linear correlation exhibited by the vibration feature quantity of the present disclosure with the square of the velocity is extremely high.

Therefore, the road vibration coefficient calculation section 24 calculates, as a road vibration coefficient ρ, a proportionality coefficient between the vibration feature quantity Pv(t) and the square of the movement velocity v(t).

Further, the vibration feature quantity calculation section 22 causes the storage section 11 to store a pair of (i) a vibration feature quantity Pv(t) calculated at a time point t and (ii) an acceleration value $\alpha_y(t)$ which is along the movement direction (x-direction) at the time point t and which has been acquired from the acquisition section 21. Specifically, the vibration feature quantity calculation section 22 causes the storage section 11 to store a measurement value which has been measured for each unit time Δt as an observation vector 42. Note that the observation vector 42 can be expressed as follows (details thereof will be described later).

$$O(t) = \begin{bmatrix} P_V(t) \\ \alpha_f(t) \end{bmatrix} \qquad \text{Expression (3)}$$

(Estimation of Movement Locus Based on VDR Technology)

The movement locus estimation section 25 estimates a movement locus of the vehicle 2 using a Kalman filter in which the vibration feature quantity described above is taken into observation.

For each unit time Δt, the movement locus estimation section 25 estimates a movement velocity of and an acceleration of along the x-direction of the vehicle 2 with use of the Kalman filter, and identifies a movement distance for each unit time Δt. Next, the movement locus estimation section 25 obtains a relative rotation amount on the z-axis for each unit time Δt based on an angular velocity value of the z-axis which has been measured by the IMU 3 for each unit time Δt. Thus, the movement locus estimation section 25 identifies, for each unit time Δt, a relative position from a position of the vehicle 2 at the previous time point, and identifies a movement locus 44 based on the relative positions.

In the present embodiment, the Kalman filter which is used by the movement locus estimation section 25 for estimation of the movement locus 44 can be defined by a state vector 43 and an observation vector 42 below. Specifically, the state vector 43 can be expressed as below with elements which are: a velocity $v_f$ (unit: [m/s]) along the movement direction; an acceleration $a_f$ (unit: [m/s²]) along the movement direction; and an offset error $b_a$ (unit: [m/s²]) included in acceleration output.

$$s_t = \begin{bmatrix} v_f \\ a_f \\ b_a \end{bmatrix} \qquad \text{Expression (4)}$$

The observation vector 42 is as shown in the above expression (3).

Figure 7:
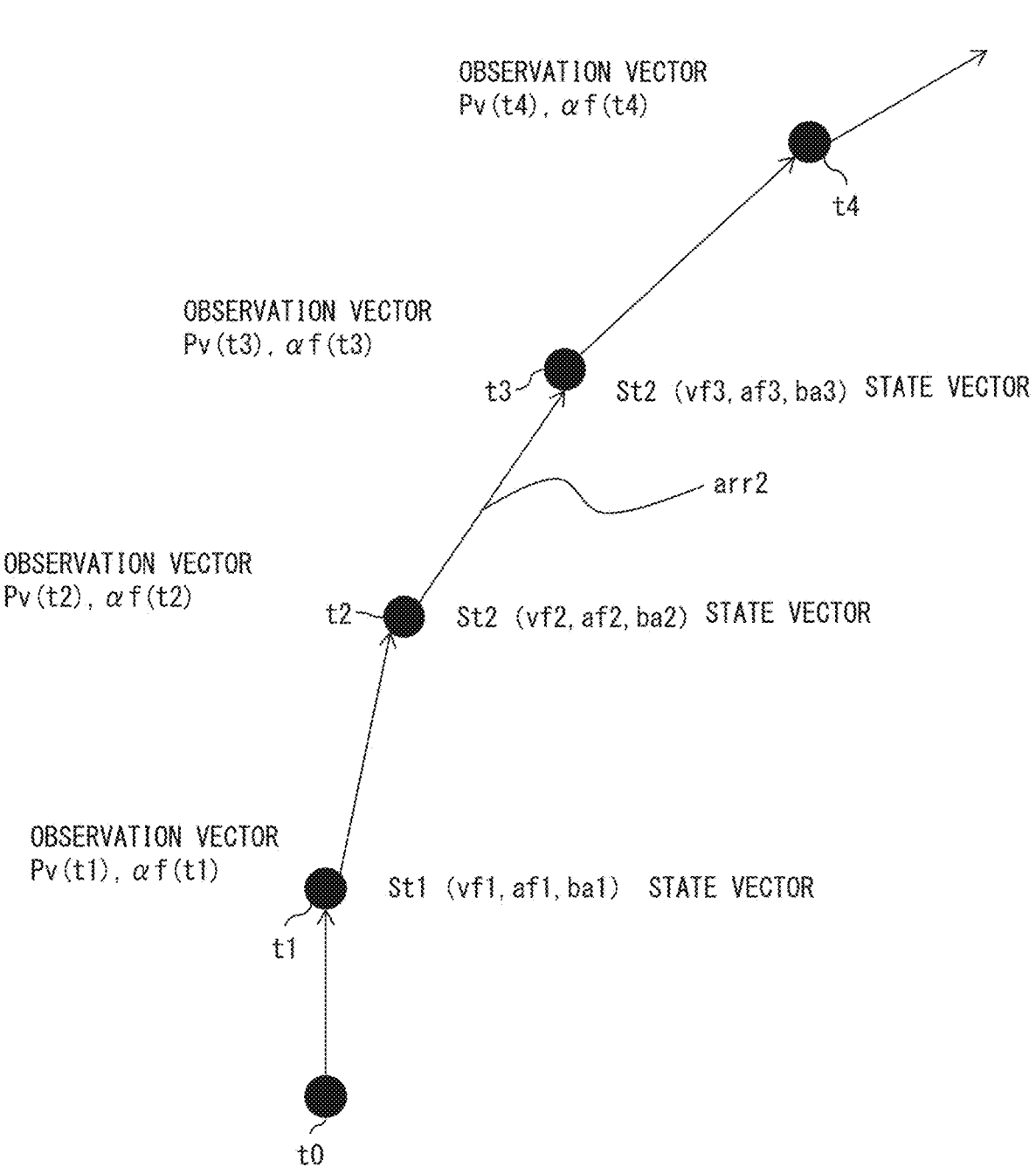
FIG. 7 is a diagram for describing a method in which a movement locus estimation section estimates a movement locus with use of a Kalman filter.

FIG. 7 is a diagram for describing a method in which the movement locus estimation section 25 estimates a movement locus 44 with use of a Kalman filter. In regard to a time point to of interest, a cycle of processes which are carried out by the movement locus estimation section 25 includes a prediction step and an updating step. In the following description, t2 is assumed to be a time point of interest.

In the prediction step, the movement locus estimation section 25 predicts estimation values of the state vector 43 at the time point t2 of interest based on estimation values $S_{t1}$ ($v_{f1}$, $a_{f1}$, and $b_{a1}$) of the state vector 43 at the previous time point t1.

In the updating step, first, the movement locus estimation section 25 obtains an observation error covariance matrix based on observation values O(t2)=(Pv(t2), αf(t2)) of the observation vector 42 which have been observed at the time point t2 of interest. Then, the movement locus estimation section 25 modifies the values predicted in the prediction step based on the observation error covariance matrix, and ultimately obtains estimation values $S_{t2}$ ($v_{f2}$, $a_{f2}$, and $b_{a2}$) of the state vector 43 at the time point t2 of interest.

Lastly, based on the movement velocity $v_{f2}$ at the time point t2 of interest and the angular velocity of the z-axis, the movement locus estimation section 25 determines how far and in which direction the vehicle 2 travels by the next time point t3 (arrow arr2). The end point of the arrow arr2 is a relative position of the vehicle 2 at the next time point t3.

The following description will discuss a specific example of the updating step described above.

First, an updating equation of the state vector 43 can be defined by an expression below.

$$s_{t+1|t} = F s_{t|t} \qquad \text{Expression (5)}$$

Here, assuming that Δt is a sample time interval [s], F can be expressed by an expression below.

$$F = \begin{bmatrix} 1 & \Delta t & 0 \\ 0 & 1 & 0 \\ 0 & 0 & 1 \end{bmatrix} \qquad \text{Expression (6)}$$

Assuming that observation related to a state vector is $\alpha_f(t)$ in which a vibration feature quantity Pv(t) and an acceleration sensor output are mapped in the moving direction, a relation between an observation vector O(t) thereof and the state vector can be expressed as the following observation equation.

$$O(t) = \begin{bmatrix} P_V(t) \\ \alpha_f(t) \end{bmatrix} = h(s_t) = \begin{bmatrix} \rho v_f^2 \\ a_f + b_a \end{bmatrix} \qquad \text{Expression (7)}$$

A function h(x) that appears in the observation equation of expression (7) is nonlinear. Therefore, the function h(x) is linearized using a linearization method with Taylor expansion. That is, by obtaining a Jacobian matrix of the function h(x), a linearized observation matrix H is obtained as below. Thus, the observation error covariance matrix is updated.

$$H = \begin{bmatrix} 2\rho v & 0 & 0 \\ 0 & 1 & 1 \end{bmatrix} \qquad \text{Expression (8)}$$

Note, however, that a value of p which appears in the observation equation of expression (7) also changes according to a change in road surface property. Therefore, an observation error related to a large vibration feature quantity is regarded as an abnormal value and is regarded as a change in road surface property. In a section where the value is abnormal, the Kalman filter is updated only in the prediction step without inputting the observation vector 42.

For example, in FIG. 7, in a case where the time point of interest is t3, the movement locus estimation section 25 compares (i) a value of $\rho_{t2}$ which is obtained from the observation vector 42 at the previous time point t2 with (ii) a value of $\rho_{t3}$ which is obtained from the observation vector 42 at the time point t3 of interest. In a case where a difference of ρ is not less than a predetermined threshold value, it can be determined that there has been a change in road surface property in a section from the time point t2 to the time point t3. In this case, in the prediction step, the movement locus estimation section 25 does not modify, based on the observation vector 42, the prediction result which has been predicted based on estimation values of the state vector 43 at the previous time point t2, and determines the prediction result as it is as estimation values $S_{t3}$ ($v_{f3}$, $a_{f3}$, and $b_{a3}$) of the state vector 43 at the time point t3.

Figure 8:
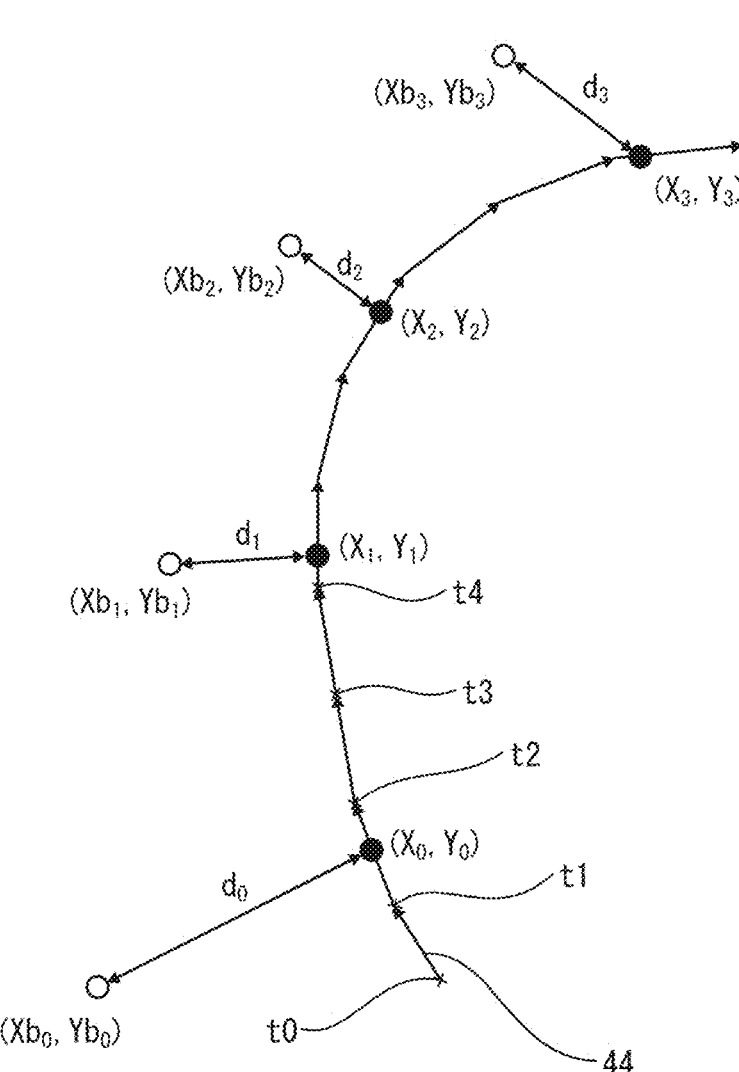
FIG. 8 is a diagram schematically illustrating a relation between a reception position from a beacon on a movement locus and a position of the beacon.

The movement locus estimation section 25 repeats the above processes for each measurement value obtained during the measurement period, acquires a movement locus 44 as illustrated in FIG. 8, and causes the storage section 11 to store the movement locus 44. The movement locus 44 is obtained by connecting relative positions of the vehicle 2 at respective predetermined times Δt, and indicates a locus along which the vehicle 2 has moved. Here, an absolute position of the movement locus 44 in the coordinate system of the traveling site has not been determined. Therefore, the positioning section 26 determines the absolute position of the movement locus 44 in the coordinate system of the traveling site. Specifically, the positioning section 26 determines the absolute position of the movement locus 44 by determining an initial position $(X_1, Y_1)$ and an initial orientation θ of the movement locus 44 in the coordinate system of the traveling site.

(Positioning of Movement Locus Based on Beacon Signal)

A BLE beacon is a communication device which is specialized in transmitting radio signals using BLE communication and is often used in indoor position measurement. RSSI of a radio wave from the BLE beacon is weakened in inverse proportion to a square of a distance from the BLE beacon. Therefore, theoretically, a position of the receiver 4, that is, the vehicle 2 can be estimated based on the RSSI from a plurality of BLE beacons. However, a signal in a 2.4 GHz band used in BLE is disturbed by various factors such as interference or reflection. Therefore, it is generally difficult to identify a position based only on a BLE beacon.

In view of this, the positioning section 26 calculates, as solutions, an initial position $(X_1, Y_1)$ and an initial orientation θ of the movement locus 44 with which a cost function is minimized which is obtained from (i) RSSI of the beacon 5 at a reception position identified on the movement locus 44 and (ii) a distance d from the reception position to the beacon 5. Specifically, the positioning section 26 decomposes an error factor in VDR into four parameters (i.e., an initial orientation θ, an initial position $X_1$ in the x-direction in the coordinate system of the traveling site, an initial position $Y_1$ in the y-direction, and a road vibration coefficient ρ as a parameter indicating a road surface property), and changes a condition of each of the parameters.

In the present embodiment, it is preferable that the positioning section 26 changes the road vibration coefficient ρ only in a section where an observation error is detected as a large abnormal value. By thus setting the road vibration coefficient ρ to be a fixed value, the positioning section 26 drastically reduces the number of combinations of the four parameters, and it is possible to obtain the absolute position of the movement locus 44 in a low-load process.

FIG. 8 is a diagram schematically illustrating a relation between a reception position from the beacon 5 on the movement locus 44 and a position of the beacon 5.

As illustrated in FIG. 8, first, the positioning section 26 identifies, on the movement locus 44, a reception position where the receiver 4 of the vehicle 2 has received a radio wave from the beacon 5. Relative positions (start points of arrows) constituting the movement locus 44 are associated with respective time stamps (time points t0, t1, t2, . . . ) of measurement values measured at Δt intervals. Meanwhile, each reception record registered in the reception record DB includes (i) a beacon ID of a beacon 5 which is a transmission source and (ii) reception date and time information at which the radio wave from that beacon 5 was received. With the configuration, the positioning section 26 can identify, as the reception position $(x_i, y_i)$ from the beacon on the movement locus 44, a position that is moved by a distance obtained by multiplying a velocity $v_f$ of the state vector at a start point by a traveling time which is determined as a difference between the time stamp and the reception date and time information.

In the example illustrated in FIG. 8, the reception position is indicated by $(x_i, y_i)$, and the position of the beacon 5 is indicated by $(x_{bi}, y_{bi})$. Here, the position $(x_{bi}, y_{bi})$ of the beacon 5 is known. Further, at each reception position, RSSI $(=r_i)$ is obtained. The positioning section 26 determines a cost function "cost" $(r_i, d_i)$ based on a distance $d_i$ between a reception position $(x_i, y_i)$ and a corresponding position $(x_{bi}, y_{bi})$ of the beacon 5, and obtains, as a solution, a combination of parameters $(\theta, X_1, Y_1, \text{and } \rho)$ with which a sum c thereof is minimized. Specifically, the positioning section 26 determines an initial orientation θ, an initial position $(X_1, Y_1)$, and a road vibration coefficient ρ of the movement locus 44 based on an expression below.

$$c(\theta, x_i, y_i, \rho) = \sum_{i=0}^{n} \text{cost}(r_i, d_i(\theta, x_i, y_i, \rho)) \qquad \text{Expression (9)}$$

Here, it is preferable that a cost function for determining a cost based on RSSI $(r_i)$ and a reception distance $d_i$ is designed based on knowledge on utilization of a BLE beacon which will be described below. That is, if the RSSI is large, the fact means that the reception distance is short, and there is no possibility that an actual reception distance is actually long. However, if the RSSI is small, the fact does not necessarily mean that the reception distance is long. This is because, for example, radio waves are blocked by obstacles such as a human body, and therefore it is possible that RSSI having a small value is observed even though an actual reception distance is short.

Figure 9:
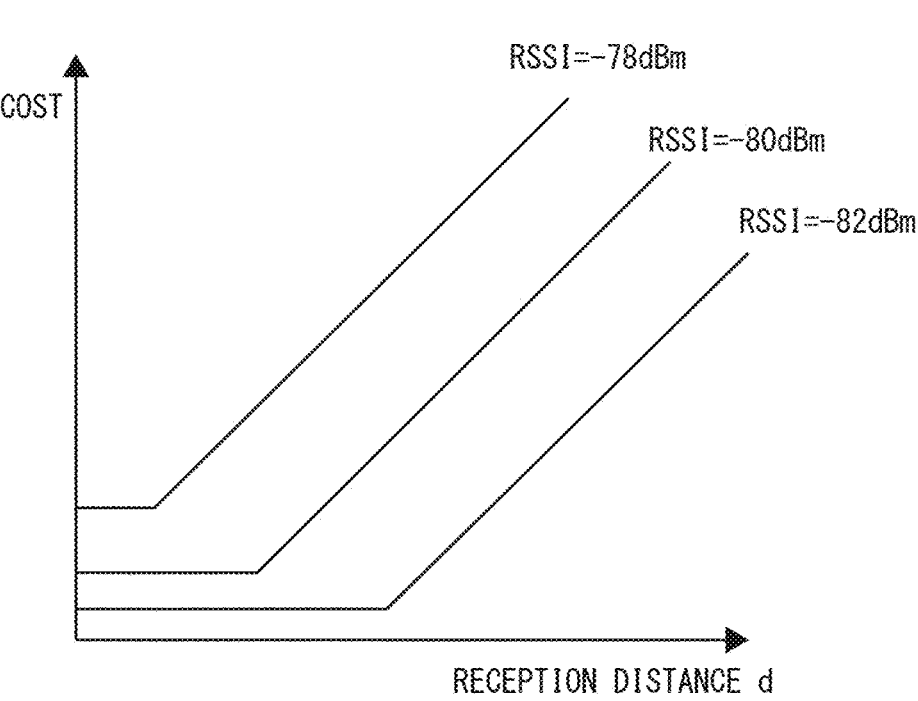
FIG. 9 is a graph showing an example of a pattern of a cost function.

In view of this, the positioning section 26 can employ a cost function illustrated in FIG. 9 as an example of a cost function which satisfies the restriction as described above. FIG. 9 is a graph showing an example of a pattern of a cost function. As illustrated in FIG. 9, a cost function can be set as follows: a cost function for which observed RSSI is higher is located above so that a higher cost is calculated; and a cost is calculated high when a reception distance is not less than a predetermined distance even though RSSI is high. When calculating a cost with respect to a certain reception position, the positioning section 26 selects a cost function according to RSSI corresponding to the reception position, applies a distance d thereto, and determines a cost at the reception position. The costs thus obtained are summed to calculate a cost for one initial position.

As described above, the positioning section 26 is capable of determining an absolute position of the movement locus 44 in the coordinate system of the traveling site. That is, the positioning section 26 is capable of determining an initial position and an initial orientation in the traveling site for the movement locus 44 and obtaining a definitive movement path of the vehicle 2 in the traveling site. Furthermore, the positioning section 26 is capable of identifying, based on a road vibration coefficient ρ which has been obtained for the movement locus 44, roughness, a step, a protrusion, a slope, and the like of a road surface in the traveling site.

<Process Flow>

Figure 10:
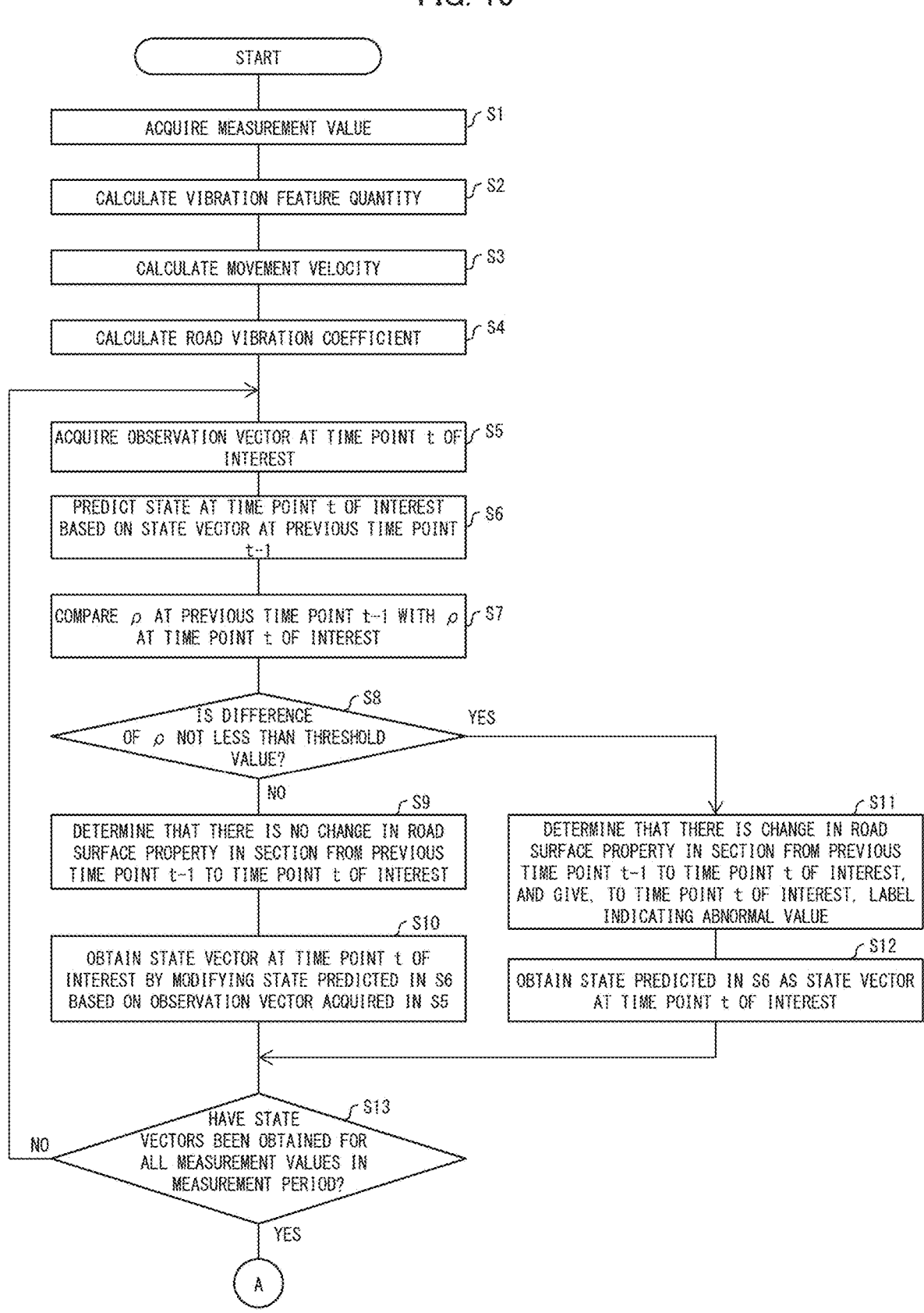
FIG. 10 is a flowchart illustrating a flow of a process which is carried out by an information processing device.
Figure 11:
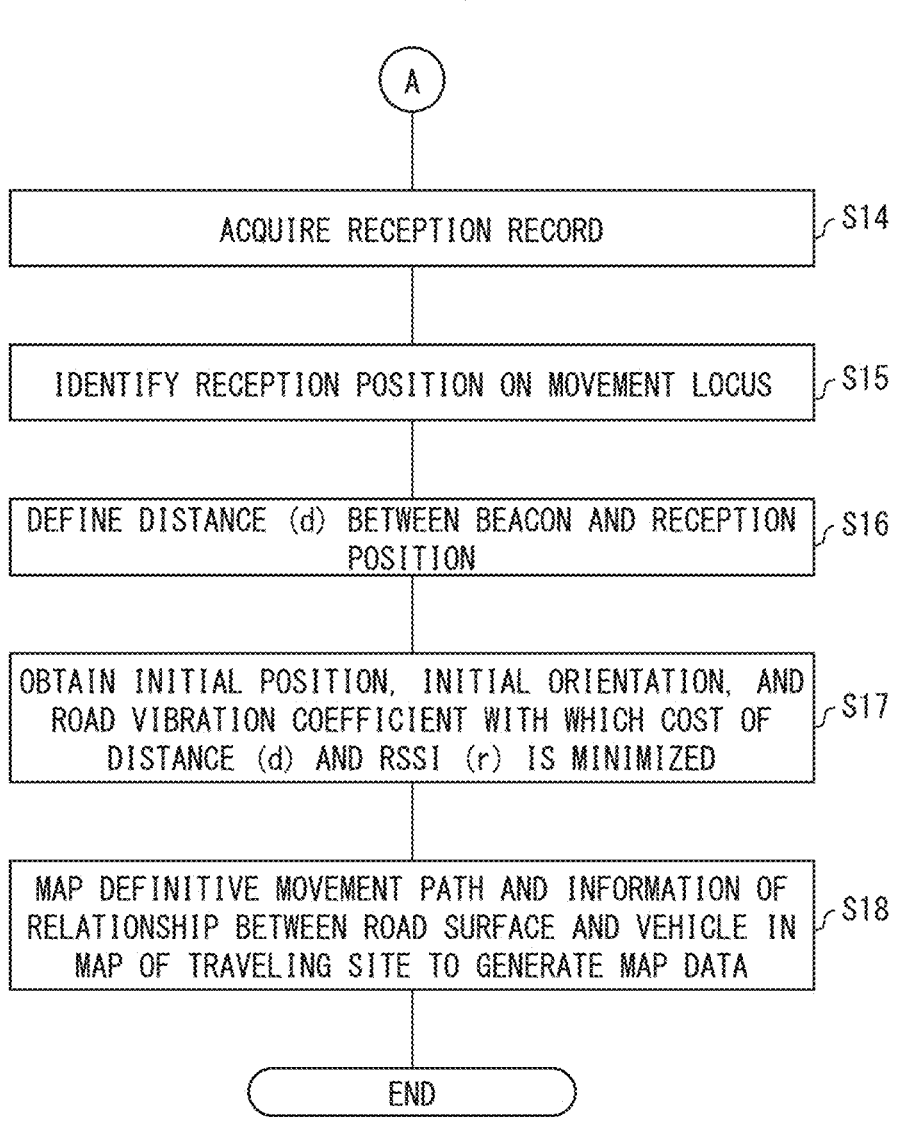
FIG. 11 is a flowchart illustrating a flow of a process which is carried out by an information processing device.

FIGS. 10 and 11 are a flowchart illustrating a flow of a process which is carried out by the information processing device 1.

In step S1 (acquisition step), the acquisition section 21 acquires measurement values for each Δt from the IMU 3 and the receiver 4. In the present embodiment, for example, the acquisition section 21 collectively acquires a group of measurement values which have been measured during a measurement period in which the vehicle 2 has traveled from a start line to a finish line in the traveling site.

In step S2 (vibration feature quantity calculation step), the vibration feature quantity calculation section 22 calculates a vibration feature quantity Pv(t) from acceleration values for respective x, y, and z components which are included in the measurement value.

In step S3, the movement velocity calculation section 23 may calculate a movement velocity v(t).

In step S4 (road vibration coefficient calculation step), the road vibration coefficient calculation section 24 calculates a road vibration coefficient ρ. Then, the road vibration coefficient calculation section 24 causes the storage section 11 to store an observation vector 42 (Pv(t), αf(t)) in association with a time stamp of the measurement value.

Steps S2 through S4 are repeated for each measurement value of each Δt. When observation vectors 42 have been stored in the storage section 11 for all measurement values, then the process proceeds to the next step S5. Next, as shown in steps S5 through S13, the movement locus estimation section 25 estimates a movement locus 44.

In step S5, the movement locus estimation section 25 reads out the observation vector 42 at a time point t of interest from the storage section 11.

In step S6, the movement locus estimation section 25 predicts a state at the time point t of interest based on a state vector 43 which is associated with a time point (hereinafter, referred to as "previous time point t−1") one Δt before the time point t of interest.

In step S7, the movement locus estimation section 25 compares a road vibration coefficient ρ at the previous time point t−1 with a road vibration coefficient ρ at the time point t of interest. As a result of the comparison, if a difference of ρ is less than a predetermined threshold value, the movement locus estimation section 25 advances the process from NO in step S8 to step S9. If the difference of ρ is not less than the predetermined threshold value, the movement locus estimation section 25 advances the process from YES in step S8 to step S11.

In step S9, the movement locus estimation section 25 determines that there is no significant change in the relationship between a road surface and a vehicle in a section from the previous time point t−1 to the time point t of interest.

In step S10, the movement locus estimation section 25 obtains a state vector 43 at the time point t of interest by modifying the state predicted in step S6 based on the observation vector 42 at the time point t of interest which has been acquired in step S5.

In step S11, the movement locus estimation section 25 determines that there is a significant change in the relationship between a road surface and a vehicle in the section from the previous time point t−1 to the time point t of interest. Here, the movement locus estimation section 25 may give, with respect to the time point t of interest, a label of an abnormal value indicating that there has been a change in the relationship between a road surface and a vehicle.

In step S12, the movement locus estimation section 25 obtains the state predicted in step S6 directly as a state vector 43 at the time point t of interest, without taking into consideration the observation vector 42 at the time point t of interest.

Note that, in step S10 or S12, the movement locus estimation section 25 identifies a relative position of the vehicle 2 at a next time point t+1. Specifically, the movement locus estimation section 25 acquires an angular velocity of the z-axis from a measurement value at the time point t of interest. The movement locus estimation section 25 estimates a movement distance and a movement direction from the time point t of interest to the next time point t+1 based on the acquired angular velocity and a movement velocity vft which is included in the state vector 43 at the time point t of interest which has been made definite in step S10 or S12. An end point of an arrow formed by the estimated movement distance and movement direction serves as a relative position of the vehicle 2 at the next time point t+1.

In step S13, the movement locus estimation section 25 analyzes all measurement values in the measurement period. Then, the movement locus estimation section 25 determines whether or not a state vector 43 and a relative position have been obtained for all time points in the measurement period. Until the analysis is finished for all the time points, the movement locus estimation section 25 returns the process from NO in step S13 to step S5, and repeats the processes of steps S5 through S13. When state vectors 43 and relative positions have been obtained for all of the time points, then the process proceeds from YES in step S13 to step S14. Thus, the movement locus 44 is completed and stored in the storage section 11.

In step S14, the positioning section 26 reads out a reception record in the above measurement period from the reception record DB 45.

In step S15, based on reception date and time information included in the reception record, the positioning section 26 identifies, on the movement locus 44, a reception position of the vehicle 2 at which a signal was received from each beacon 5.

In step S16, the positioning section 26 defines a distance (d) between a disposed position of the beacon 5 and the reception position.

In step S17, the positioning section 26 identifies a combination of parameters of an initial position, an initial orientation, and a road vibration coefficient with which a cost of distance (d) and RSSI (r) is minimized.

In step S18, the positioning section 26 maps a definitive movement path in the coordinate system of the traveling site based on the initial position and the initial orientation which have been identified in step S17, and the positioning section 26 maps information of a road surface property in the coordinate system of the traveling site based on the road vibration coefficient which has been identified in step S17. In this manner, the positioning section 26 generates map data 46 in which the definitive movement path of the vehicle 2 and the information on the road surface property are mapped, and causes the storage section 11 to store the map data 46.

<Application Example>

According to the information processing device 1 and the method of the present disclosure, a vibration feature quantity having a high linear correlation with a square of a movement velocity of a vehicle is calculated, and it is therefore possible to obtain a road vibration coefficient ρ which represents roughness of a road surface.

Furthermore, for example, for an indoor environment in which a Bluetooth low energy (BLE) beacon is provided, the VDR technique and a reception record of the beacon are combined to calculate a cost. Thus, it is possible to automatically estimate, using a road vibration coefficient ρ at a start point of a movement locus 44, a road vibration coefficient ρ of a subsequent movement path. It has been found that a road vibration coefficient ρ represents roughness of a road surface. Obtaining a road vibration coefficient ρ on a map of a traveling site contributes to not only obtaining an appropriate road vibration coefficient ρ for an actually traveled vehicle 2, but also obtaining an appropriate road vibration coefficient ρ for another vehicle of the same type.

Furthermore, according to the information processing device 1 and the method of the present disclosure, a step, a protrusion, a slope, or a sudden change in a road surface property which the vehicle 2 has encountered while traveling is detected as a local abnormal value of a road vibration coefficient ρ. Therefore, it can be expected that mapping of a location at which the abnormal value has been detected in a map of a traveling site contributes to creation of a barrier-free map for a wheelchair or an autonomous robot.

In addition, for a change in road vibration coefficient, simple measurement can be expected by combination with a satellite-based position measurement such as a global positioning system (GPS). Therefore, there is a possibility that the present invention can be applied to measurement of road surface deterioration on a general road or an expressway.

Example 1

The following description will discuss one Example of the present invention. An evaluation experiment was carried out in an experiment environment (laboratory area of 33 m×53 m) illustrated in FIG. 12. In this environment, a total of BLE beacons (manufactured by Aplix Corporation) were arranged, as indicated by square marks in FIG. 12. The bold line (start and end points are indicated by star-shaped markers) in FIG. 12 indicates a true value (movement distance: 139.1 m) of a movement path by an electric wheelchair (manufactured by Whill) as the vehicle 2, and was measured using LiDAR. There were two types of areas in this environment where road surface conditions were different (a carpet-like floor surface and a slick floor surface). A separately carried out experiment showed in advance that a difference in road vibration coefficient ρ was approximately 1.5 times.

In this evaluation experiment, position measurement accuracy was evaluated under two conditions: a case in which an initial orientation was aligned with the true value (=90 degrees); and a case in which exploring was started while setting the initial orientation to be unknown. As an inertial measurement unit, a smartphone (Google Pixel 3XL, Android (registered trademark) 9.0) in which a dedicated application was installed was used. Based on a measurement value group (measurement frequency: 100 Hz) acquired by the dedicated application, a movement locus of the above described electric wheelchair was estimated according to the method of the present disclosure. An error was evaluated by comparing the estimation result thus obtained with the true value acquired by the LiDAR. An exploring condition for the initial orientation was an omni-directional search in one-degree increments. An exploring condition for the initial position was set to search of a range of maximum of ±15 m in increments of 0.25 m. An exploring condition for the road vibration coefficient was set to search of a range of 0.25 to 2.0 in increments of 0.01. In addition, received data in which RSSI of the BLE beacon was not more than −90 dBm was discarded.

Figures 12, 13:
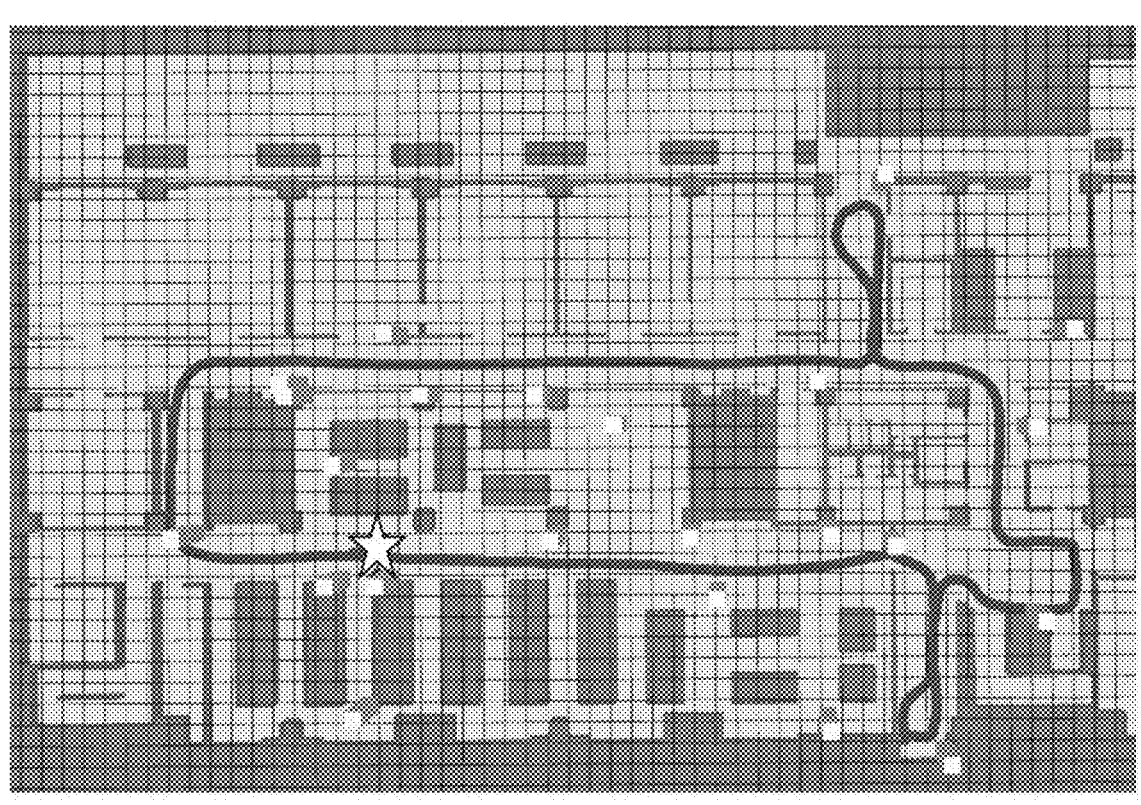
FIG. 12 is a diagram illustrating a map of an experiment environment in which an evaluation experiment was carried out.
FIG. 13 is a table indicating an evaluation result of the evaluation experiment.

The results of the evaluation experiment are indicated in FIG. 13. Note that, in this evaluation experiment, abnormal values of the road vibration coefficient ρ were detected at a total of four locations, three of which were steps on the road surface and the remaining one was a change in the road surface property. Moreover, an error ratio of the road vibration coefficient ρ which was automatically estimated was within 10%.

In the present disclosure, a vibration feature quantity having a high linear correlation with a square of a velocity has been proposed. Moreover, based on the vibration feature quantity, a velocity estimation method and a movement locus estimation method using an extended Kalman filter have been proposed. In addition, a method of automatically estimating a road vibration coefficient for a road surface and a vehicle in a traveling site where BLE beacons are disposed has been proposed. As a result of the traveling evaluation experiment using the electric wheelchair, it has been indicated that, with respect to the true value measured by LiDAR, the definitive movement path obtained based on the method proposed in the present disclosure exhibits a cumulative error which is suppressed to approximately 2% to 3% in proportion to the traveling distance.

[Software Implementation Example]

The control blocks of the information processing device 1 (in particular, the acquisition section 21, the vibration feature quantity calculation section 22, the movement velocity calculation section 23, the road vibration coefficient calculation section 24, the movement locus estimation section 25, and the positioning section 26) can be realized by a logic circuit (hardware) formed on an integrated circuit (IC chip) or the like or can be alternatively realized by software.

In the latter case, the information processing device 1 includes a computer that executes instructions of a program that is software realizing the foregoing functions. The computer includes, for example, at least one processor and a computer-readable storage medium that stores the program. In the computer, the processor reads the program from the storage medium and executes the program, so that the object of the present invention is attained. The processor can be, for example, a central processing unit (CPU). The storage medium can be a "non-transitory tangible medium" which is, for example, a read only memory (ROM), or alternatively a tape, a disk, a card, a semiconductor memory, a programmable logic circuit, or the like. The computer may further include a random access memory (RAM) or the like in which the program is loaded. Further, the program may be supplied to the computer via any transmission medium (such as a communication network and a broadcast wave) which allows the program to be transmitted. An aspect of the present invention can also be achieved in the form of a data signal in which the program is embodied via electronic transmission and which is embedded in a carrier wave.

ADDITIONAL REMARKS

The information processing device 1 in accordance with the present disclosure includes: an acquisition section 21 that acquires a measurement value which has been measured by a sensor (IMU 3) provided in a vehicle 2 while the vehicle 2 is traveling on a road surface; a vibration feature quantity calculation section 22 that calculates a vibration feature quantity Pv(t) based on expressions below from acceleration values for respective x, y, and z components, the acceleration values being included in the measurement value which has been acquired, $$P_V(t) = \frac{1}{N_{FFT}} \sum_{i=n_m}^{n} \frac{p(f_i)^2}{f_i^2}$$

where $N_{FFT}$ is the number of taps of FFT, $$p(f_i)^2 = px(f_i)^2 + py(f_i)^2 + pz(f_i)^2$$

where px($f_i$), py($f_i$), and pz($f_i$) are power values in a
frequency band $f_i$ which have been obtained by FFT
from the acceleration values for the respective x, y, and
z components, and $f_0$ to $f_{n\_m}$ are a DC component and a near frequency band
thereof; and a road vibration coefficient calculation section that cal-
culates a road vibration coefficient ρ based on the
vibration feature quantity Pv(t) which has been calcu-
lated and an expression below, $$Pv(t)=\rho\cdot v(t)^2$$

where v(t) is a velocity of the vehicle, and

ρ is a road vibration coefficient which is a parameter
indicating a relationship between the road surface and
the vehicle.

It is possible that the information processing device 1
further includes: a movement locus estimation section 25
that identifies a movement distance for each unit time Δt by
estimating, for each unit time Δt in which the measurement
value is obtained, a movement velocity of and an accelera-
tion of along an x-direction of the vehicle with use of a
Kalman filter, in a prediction step of the Kalman filter, the
movement locus estimation section obtaining prediction
values of a movement velocity vft and an acceleration aft at
a time point t of interest based on a movement velocity $v_{ft-1}$
and an acceleration $a_{ft-1}$ which have been estimated at a time
point t−1 which precedes the time point t of interest by the
unit time Δt, in an updating step of the Kalman filter, the
movement locus estimation section (i) obtaining an obser-
vation error covariance matrix below based on a vibration
feature quantity Pv(t) and an acceleration αf(t) which have
been observed at the time point t of interest, $$H=\begin{bmatrix}2\rho v & 0 & 0\\ 0 & 1 & 1\end{bmatrix}$$

(ii) modifying, based on the observation error covariance
matrix, the prediction values which have been predicted in
the prediction step, and thus (iii) obtaining estimation values
of the movement velocity $v_{ft}$ and the acceleration $a_{ft}$ at the
time point t of interest.

It is possible that, in the information processing device 1:
the movement locus estimation section acquires a rotation
amount around a z-axis for each unit time Δt based on an
angular velocity value of the z-axis which has been mea-
sured by the sensor for each unit time Δt; and the movement
locus estimation section estimates a movement distance and
a movement direction until a time point t+1 which is after
the time point t of interest by the unit time Δt based on the
estimation values of the movement velocity $v_{ft}$ and the
acceleration $a_{ft}$ and the rotation amount around the z-axis at
the time point t of interest.

It is possible that the information processing device 1
further includes: a positioning section that determines, for a
movement locus 44 which is identified from a movement
distance and a movement direction estimated by the move-
ment locus estimation section for each unit time Δt, a
movement path in a traveling site of the vehicle by deter-
mining an initial position and an initial orientation as initial
conditions in a coordinate system of the traveling site where
the vehicle has traveled, the vehicle being provided with a
receiver that receives radio signals from one or more trans-
mitters disposed in the traveling site, the acquisition section
acquiring a reception record which is output from the
receiver, the reception record including a transmitter ID for identifying a transmission source, reception date and time
information indicating a date and time at which the radio
signal was received, and received signal strength (RSSI)
indicating signal strength at the reception, the positioning
section identifying, based on the reception date and time
information, a reception position at which the receiver
received the radio signal from the transmitter on the move-
ment locus, and the positioning section identifying, as the
initial conditions, an initial orientation θ, an initial position
$X_1$ in an x-direction in the coordinate system of the traveling
site, and an initial position $Y_1$ in a y-direction in the
coordinate system such that a cost is minimum, which is
obtained from a distance (d) from a position of the trans-
mitter to the reception position in the coordinate system of
the traveling site and RSSI at the reception position.

It is possible that, in the information processing device 1:
the positioning section generates map data 46 of the trav-
eling site by plotting the movement locus as a definitive
movement path in the coordinate system of the traveling site
based on the initial position $X_1$ in the x-direction, the initial
position $Y_1$ in the y-direction, and the initial orientation θ
which have been identified.

An information processing device in accordance with the
present disclosure includes: an acquisition section that
acquires a measurement value which has been measured by
a sensor provided in a vehicle while the vehicle is traveling
on a road surface; a vibration feature quantity calculation
section that calculates a vibration feature quantity Pv(t)
based on expressions below from acceleration values for
respective x, y, and z components, the acceleration values
being included in the measurement value which has been
acquired, $$P_V(t)=\frac{1}{N_{FFT}}\sum_{i=n_m}^{n}\frac{p(f_i)^2}{f_i^2}$$

where $N_{FFT}$ is the number of taps of FFT, $$p(f_i)^2=px(f_i)^2+py(f_i)^2+pz(f_i)^2$$

where px($f_i$), py($f_i$), and pz($f_i$) are power values in a
frequency band $f_i$ which have been obtained by FFT
from the acceleration values for the respective x, y, and
z components, and $f_0$ to $f_{n\_m}$ are a DC component and a near frequency band
thereof; and a movement velocity calculation section 23 that calculat-
ing v(t) based on the vibration feature quantity Pv(t)
which has been calculated, an expression below, and a
road vibration coefficient ρ which has been set in
advance, $$Pv(t)=\rho\cdot v(t)^2$$

where v(t) is a velocity of the vehicle, and

ρ is a road vibration coefficient which is a parameter
indicating a relationship between the road surface and
the vehicle.

An information processing method in accordance with the
present disclosure includes: an acquisition step of acquiring
a measurement value which has been measured by a sensor
provided in a vehicle while the vehicle is traveling on a road
surface; a vibration feature quantity calculation step of
calculating a vibration feature quantity Pv(t) based on
expressions below from acceleration values for respective x,
y, and z components, the acceleration values being included
in the measurement value which has been acquired,

19

$$P_V(t) = \frac{1}{N_{FFT}} \sum_{i=n_m}^{n} \frac{p(f_i)^2}{f_i^2}$$

where $N_{FFT}$ is the number of taps of FFT, $$p(f_i)^2 = px(f_i)^2 + py(f_i)^2 + pz(f_i)^2$$

where $px(f_i)$, $py(f_i)$, and $pz(f_i)$ are power values in a frequency band $f_i$ which have been obtained by FFT from the acceleration values for the respective x, y, and z components, and $f_0$ to $f_{n\_m}$ are a DC component and a near frequency band thereof; and a road vibration coefficient calculation step of calculating a road vibration coefficient ρ based on the vibration feature quantity Pv(t) which has been calculated and an expression below, $$Pv(t) = \rho \cdot v(t)^2$$

where v(t) is a velocity of the vehicle, and

ρ is a road vibration coefficient which is a parameter indicating a relationship between the road surface and the vehicle.

An information processing method in accordance with the present disclosure includes: an acquisition step of acquiring a measurement value which has been measured by a sensor provided in a vehicle while the vehicle is traveling on a road surface; a vibration feature quantity calculation step of calculating a vibration feature quantity Pv(t) based on expressions below from acceleration values for respective x, y, and z components, the acceleration values being included in the measurement value which has been acquired, $$P_V(t) = \frac{1}{N_{FFT}} \sum_{i=n_m}^{n} \frac{p(f_i)^2}{f_i^2}$$

where $N_{FFT}$ is the number of taps of FFT, $$p(f_i)^2 = px(f_i)^2 + py(f_i)^2 + pz(f_i)^2$$

where $px(f_i)$, $py(f_i)$, and $pz(f_i)$ are power values in a frequency band $f_i$ which have been obtained by FFT from the acceleration values for the respective x, y, and z components, and $f_0$ to $f_{n\_m}$ are a DC component and a near frequency band thereof; and a movement velocity calculation step of calculating v(t) based on the vibration feature quantity Pv(t) which has been calculated, an expression below, and a road vibration coefficient ρ which has been set in advance, $$Pv(t) = \rho \cdot v(t)^2$$

where v(t) is a velocity of the vehicle, and

ρ is a road vibration coefficient which is a parameter indicating a relationship between the road surface and the vehicle.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Information processing device
2: Vehicle

20

3: IMU (sensor)
4: Receiver
5: BLE beacon (transmitter)
10: Control section
11: Storage section
12: Communication section
21: Acquisition section
22: Vibration feature quantity calculation section
23: Movement velocity calculation section
24: Road vibration coefficient calculation section
25: Movement locus estimation section
100: Vehicle position measurement system

The invention claimed is:

1. An information processing device, comprising a computer processor configured to:

acquire a measurement value which has been measured by a sensor provided in a vehicle while the vehicle is traveling on a road surface;

calculate a vibration feature quantity $P_y(t)$ based on expressions below from acceleration values for respective X, y, and Z components, the acceleration values being included in the measurement value which has been acquired, Pv(t)=. . . where $N_{FFT}$ is the number of taps of Fast Fourier Transform (FFT), $p(fi)^2 = px(fi)^2 + py(fi)^2 + pz(fi)^2$ where px(fi), py(fi), and pz(fi) are power values in a frequency band fi which have been obtained by FFT from the acceleration values for the respective x, y, and z components, and $f_0$ to $f_{n\_m}$ are a DC component and a near frequency band thereof;

calculates a road vibration coefficient ρ based on the vibration feature quantity $P_y(t)$ which has been calculated and an expression below, $P_y(t) = \rho \cdot v(t)^2$ where v(t) is a velocity of the vehicle, and ρ is a road vibration coefficient which is a parameter indicating a relationship between the road surface and the vehicle;

wherein $f_0$ to $f_{n\_m}$ corresponds to a DC component when i=0 and a near band frequency of the DC component when i=1 to n_m;

identify a movement distance for each time Δt in which the measurement value is obtained, determine, for a movement locus which is identified from the movement distance and a movement direction estimated for each unit time Δt, a movement path in a traveling site of the vehicle by determining an initial position and an initial orientation as initial conditions in a coordinate system of a traveling site where the vehicle has traveled, the vehicle being provided with a receiver that receives radio signals from one or more transmitters disposed in the traveling site, acquire a reception record which is output from the receiver, the reception record including a transmitter ID for identifying a transmission source, reception date and time information indicating a date and time at which the radio signal was received, and received signal strength (RSSI) indicating signal strength at the reception, identify, based on the reception date and time information, a reception position at which the receiver received the radio signal from the transmitter on the movement locus, and identify, as the initial conditions, an initial orientation Θ, an initial position $X_I$ in an x-direction in the coordinate system of the traveling site, and an initial position $Y_I$ in a y-direction in the coordinate system such that a cost is minimum, which is obtained from a distance (d) from a position of the transmitter to the reception position in the coordinate system of the traveling site and RSSI at the reception position.

2. The information processing device as set forth in claim 1, wherein the computer processor is further configured to:

identify the movement distance for each unit time $\Delta t$ by estimating, for each unit time $\Delta t$ in which the measurement value is obtained, a movement velocity vf and an acceleration $a_f$ along an x-direction of the vehicle with use of a Kalman filter, in a prediction step of the Kalman filter, obtains prediction values of a movement velocity $v_{ft}$ and an acceleration art at a time point t of interest based on a movement velocity $v_{ft-1}$ and an acceleration $a_{ft-1}$ which have been estimated at a time point t–1 which precedes the time point t of interest by the unit time $\Delta t$, in an updating step of the Kalman filter, (i) obtain an observation error covariance matrix below based on the vibration feature quantity Pv(t) and an acceleration $\alpha f(t)$ which have been observed at the time point t of interest,

H=. . .

(ii) modify, based on the observation error covariance matrix, the prediction values which have been predicted in the prediction step, and thus (iii) obtain estimation values of the movement velocity vit and the acceleration art at the time point t of interest.

3. The information processing device as set forth in claim 2, wherein the computer processor is further configured to:

acquire a rotation amount around a z-axis for each unit time $\Delta t$ based on an angular velocity value of the z-axis which has been measured by the sensor for each unit time $\Delta t$; and estimate the movement distance and the movement direction until a time point t+1 which is after the time point t of interest by the unit time $\Delta t$ based on the estimation values of the movement velocity vft and the acceleration aft and the rotation amount around the z-axis at the time point t of interest.

4. The information processing device as set forth in claim 1, wherein the computer processor: generates the map data of the traveling site by plotting the movement locus as a definitive movement path in the coordinate system of the traveling site based on the initial position $X_I$ in the x-direction, the initial position $Y_I$ in the y-direction, and the initial orientation $\Theta$ which have been identified.

5. An information processing device, comprising a computer processor configured to:

acquire a measurement value which has been measured by a sensor provided in a vehicle while the vehicle is traveling on a road surface;

calculate a vibration feature quantity $P_v(t)$ based on expressions below from acceleration values for respective X, y, and Z components, the acceleration values being included in the measurement value which has been acquired, Pv(t)=. . . where $N_{FFT}$ is the number of taps of Fast Fourier Transform (FFT), $p(fi)^2 = px(fi)^2 + py(fi)^2 + pz(fi)^2$ where px(fi), py(fi), and pz(fi) are power values in a frequency band fi which have been obtained by FFT from the acceleration values for the respective x, y, and z components, and $f_0$ to $f_{n\_m}$ are a DC component and a near frequency band thereof;

calculates v(t) based on the vibration feature quantity $P_v(t)$ which has been calculated, an expression below, and a road vibration coefficient $\rho$ which has been set in advance, $P_v(t) = \rho \cdot v(t)_2$ where v(t) is a velocity of the vehicle, and $\rho$ is a road vibration coefficient which is a parameter indicating a relationship between the road surface and the vehicle wherein $f_0$ to $f_{n\_m}$ corresponds to a DC component when i=0 and a near band frequency of the DC component when i=1 to n_m;

identify a movement distance for each time $\Delta t$ in which the measurement value is obtained, determine, for a movement locus which is identified from the movement distance and a movement direction estimated for each unit time $\Delta t$, a movement path in a traveling site of the vehicle by determining an initial position and an initial orientation as initial conditions in a coordinate system of a traveling site where the vehicle has traveled, the vehicle being provided with a receiver that receives radio signals from one or more transmitters disposed in the traveling site, acquire a reception record which is output from the receiver, the reception record including a transmitter ID for identifying a transmission source, reception date and time information indicating a date and time at which the radio signal was received, and received signal strength (RSSI) indicating signal strength at the reception, identify, based on the reception date and time information, a reception position at which the receiver received the radio signal from the transmitter on the movement locus, and identify, as the initial conditions, an initial orientation $\Theta$, an initial position $X_I$ in an x-direction in the coordinate system of the traveling site, and an initial position $Y_I$ in a y-direction in the coordinate system such that a cost is minimum, which is obtained from a distance (d) from a position of the transmitter to the reception position in the coordinate system of the traveling site and RSSI at the reception position.

6. An information processing method performing using a computer processor, the method comprising:

an acquisition step of acquiring with the computer processor a measurement value which has been measured by a sensor provided in a vehicle while the vehicle is traveling on a road surface;

a vibration feature quantity calculation step of calculating with the computer processor a vibration feature quantity Pv(t) based on expressions below from acceleration values for respective x, y, and z components, the acceleration values being included in the measurement value which has been acquired, Pv(t)=. . . where $N_{FFT}$ is the number of taps of Fast Fourier Transform (FFT), $p(fi)^2 = px(fi)^2 + py(fi)^2 + pz(fi)^2$ where px(fi), py(fi), and pz(fi) are power values in a frequency band fi which have been obtained by FFT from the acceleration values for the respective x, y, and z components, and $f_0$ to $f_{n\_m}$ are a DC component and a near frequency band thereof;

a road vibration coefficient calculates step of calculating with the computer processor a road vibration coefficient $\rho$ based on the vibration feature quantity $P_v(t)$ which has been calculated and an expression below, $P_v(t)=\rho \cdot v(t)^2$ where v(t) is a velocity of the vehicle, and $\rho$ is a road vibration coefficient which is a parameter indicating a relationship between the road surface and the vehicle;

wherein $f_0$ to $f_{n\_m}$ corresponds to a DC component when i=0 and a near band frequency of the DC component when i=1 to n_m;

identify a movement distance for each time Δt in which the measurement value is obtained, determine, for a movement locus which is identified from the movement distance and a movement direction estimated for each unit time Δt, a movement path in a traveling site of the vehicle by determining an initial position and an initial orientation as initial conditions in a coordinate system of a traveling site where the vehicle has traveled, the vehicle being provided with a receiver that receives radio signals from one or more transmitters disposed in the traveling site, acquire a reception record which is output from the receiver, the reception record including a transmitter ID for identifying a transmission source, reception date and time information indicating a date and time at which the radio signal was received, and received signal strength (RSSI) indicating signal strength at the reception, identify, based on the reception date and time information, a reception position at which the receiver received the radio signal from the transmitter on the movement locus, and identify, as the initial conditions, an initial orientation Θ, an initial position $X_I$ in an x-direction in the coordinate system of the traveling site, and an initial position $Y_I$ in a y-direction in the coordinate system such that a cost is minimum, which is obtained from a distance (d) from a position of the transmitter to the reception position in the coordinate system of the traveling site and RSSI at the reception position.

7. An information processing method performing using a computer processor, the method comprising:

an acquisition step of acquiring with the computer processor a measurement value which has been measured by a sensor provided in a vehicle while the vehicle is traveling on a road surface;

a vibration feature quantity calculation step of calculating with the computer processor a vibration feature quantity Pv(t) based on expressions below from acceleration values for respective x, y, and z components, the acceleration values being included in the measurement value which has been acquired, $Pv(t)=$ . . . where $N_{FFT}$ is the number of taps of Fast Fourier Transform (FFT), $p(fi)^2 = px(fi)^2 + py(fi)^2 + pz(fi)^2$ where px(fi), py(fi), and pz(fi) are power values in a frequency band fi which have been obtained by FFT from the acceleration values for the respective x, y, and z components, and $f_0$ to $f_{n\_m}$ are a DC component and a near frequency band thereof;

a movement velocity calculation step of calculating with the computer processor v(t) based on the vibration feature quantity $P_v(t)$ which has been calculated and an expression below, and a road vibration coefficient $\rho$ which has been set in advance, $P_v(t)=\rho \cdot v(t)^2$ where v(t) is a velocity of the vehicle, and $\rho$ is a road vibration coefficient which is a parameter indicating a relationship between the road surface and the vehicle;

wherein $f_0$ to $f_{n\_m}$ corresponds to a DC component when i=0 and a near band frequency of the DC component when i=1 to n_m;

identify a movement distance for each time Δt in which the measurement value is obtained, determine, for a movement locus which is identified from the movement distance and a movement direction estimated for each unit time Δt, a movement path in a traveling site of the vehicle by determining an initial position and an initial orientation as initial conditions in a coordinate system of a traveling site where the vehicle has traveled, the vehicle being provided with a receiver that receives radio signals from one or more transmitters disposed in the traveling site, acquire a reception record which is output from the receiver, the reception record including a transmitter ID for identifying a transmission source, reception date and time information indicating a date and time at which the radio signal was received, and received signal strength (RSSI) indicating signal strength at the reception, identify, based on the reception date and time information, a reception position at which the receiver received the radio signal from the transmitter on the movement locus, and identify, as the initial conditions, an initial orientation Θ, an initial position $X_I$ in an x-direction in the coordinate system of the traveling site, and an initial position $Y_I$ in a y-direction in the coordinate system such that a cost is minimum, which is obtained from a distance (d) from a position of the transmitter to the reception position in the coordinate system of the traveling site and RSSI at the reception position.

8. A non-transitory computer readable medium that stores a control program, wherein the control program causes a computer to function as an information processing device recited in claim 1.

9. A non-transitory computer readable medium that stores a control program, wherein the control program causes a computer to function as an information processing device recited in claim 5.

* * * * *